(12) United States Patent
Migliaro, Jr.

(10) Patent No.: US 9,951,720 B2
(45) Date of Patent: Apr. 24, 2018

(54) DIVOT FOR BLOCKER DOORS OF THRUST REVERSER SYSTEM

(71) Applicant: United Technologies Corporation, Hartford, CT (US)

(72) Inventor: Edward F. Migliaro, Jr., Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 533 days.

(21) Appl. No.: 14/430,241

(22) PCT Filed: Feb. 21, 2013

(86) PCT No.: PCT/US2013/027086
§ 371 (c)(1),
(2) Date: Mar. 23, 2015

(87) PCT Pub. No.: WO2014/051667
PCT Pub. Date: Apr. 3, 2014

(65) Prior Publication Data
US 2015/0211443 A1    Jul. 30, 2015

Related U.S. Application Data

(60) Provisional application No. 61/706,892, filed on Sep. 28, 2012.

(51) Int. Cl.
*F02K 1/62* (2006.01)
*F02K 1/72* (2006.01)
(Continued)

(52) U.S. Cl.
CPC ............. *F02K 1/62* (2013.01); *B64D 29/06* (2013.01); *F02K 1/625* (2013.01); *F02K 1/72* (2013.01);
(Continued)

(58) Field of Classification Search
CPC . F01K 1/625; F01K 1/805; F02K 1/72; B64D 29/06
(Continued)

(56) References Cited

U.S. PATENT DOCUMENTS 3,500,644 A    3/1970 Hom et al.
3,500,645 A    3/1970 Hom
(Continued)

FOREIGN PATENT DOCUMENTS

EP    2060768 A2    5/2009

OTHER PUBLICATIONS

International Search Report & Written Opinion for International Application No. PCT/US2013/027086 dated Dec. 6, 2013.
(Continued)

*Primary Examiner* — Jason Shanske
(74) *Attorney, Agent, or Firm* — Carlson, Gaskey & Olds, P.C.

(57) ABSTRACT

A gas turbine engine includes a thrust reverser including a plurality of blocker doors moveable between a deployed position and a stowed position. A gap is defined between adjacent blocker doors when in the stowed position. A plurality of divots are mounted forward of the plurality of blocker doors to substantially cover the gap between the adjacent blocker doors when in the stowed position.

16 Claims, 3 Drawing Sheets

(51) Int. Cl.
*B64D 29/06* (2006.01)
*F02K 1/80* (2006.01)

(52) U.S. Cl.
CPC .......... *F02K 1/805* (2013.01); *F05D 2240/55* (2013.01); *F05D 2250/11* (2013.01)

(58) Field of Classification Search
USPC ........................................................ 60/226.2
See application file for complete search history.

(56) References Cited

U.S. PATENT DOCUMENTS

| | | |
|---|---|---|
| 3,603,090 A | 9/1971 | Billinger et al. |
| 4,577,814 A | 3/1986 | Bayle-Laboure et al. |
| 5,082,209 A | 1/1992 | Keyser |
| 5,666,802 A | 9/1997 | Lair |
| 5,910,094 A | 6/1999 | Kraft et al. |
| 7,966,808 B2 | 6/2011 | Tsou et al. |
| 8,122,702 B2 | 2/2012 | Tsou et al. |
| 8,157,270 B2 | 4/2012 | Tsou et al. |
| 2001/0010148 A1 | 8/2001 | Michel et al. |
| 2008/0271432 A1 | 11/2008 | Tsou et al. |
| 2009/0100918 A1 | 4/2009 | Cires |
| 2010/0064659 A1 | 3/2010 | Wang |
| 2012/0079804 A1* | 4/2012 | Stuart .............. F02K 1/72 60/226.2 |
| 2013/0025259 A1* | 1/2013 | Beardsley ........ F02K 1/72 60/226.2 |
| 2013/0067884 A1* | 3/2013 | Bhatt .............. F02K 1/72 60/204 |
| 2013/0205753 A1* | 8/2013 | Todorovic ........ F02K 3/025 60/226.2 |
| 2013/0219857 A1* | 8/2013 | Zysman ........... F02K 1/72 60/226.2 |

OTHER PUBLICATIONS

International Preliminary Report on Patentability for PCT Application No. PCT/US2013/027086, dated Apr. 9, 2015.
European Search Report for EP Application No. 13840291.2 dated Sep. 25, 2015.

* cited by examiner

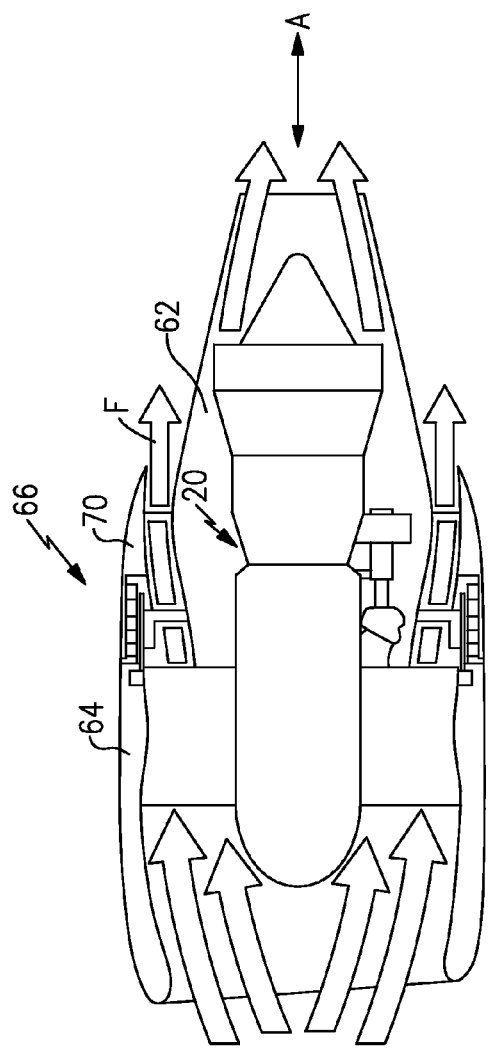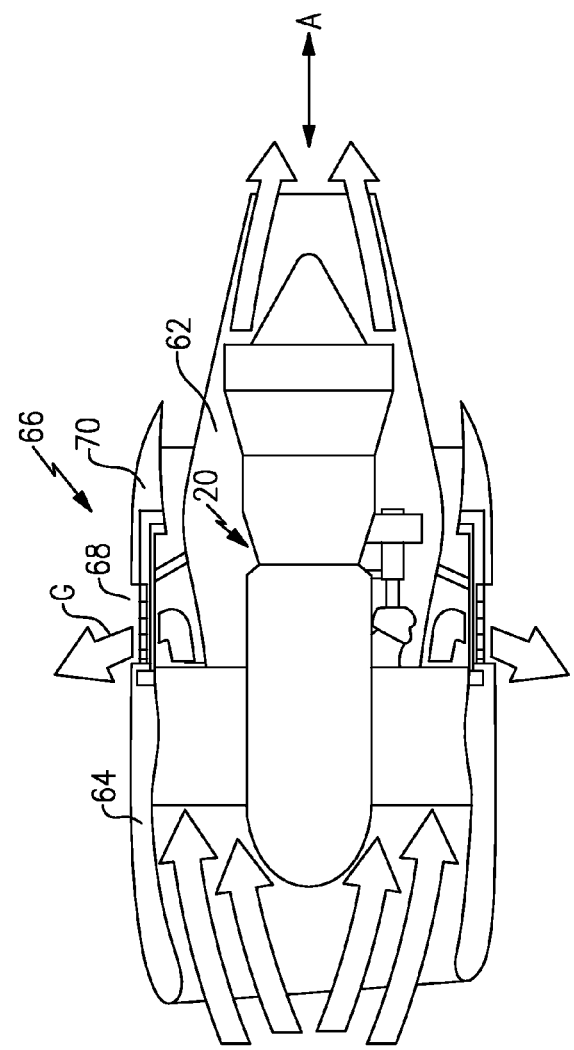

DIVOT FOR BLOCKER DOORS OF THRUST REVERSER SYSTEM

REFERENCE TO RELATED APPLICATIONS

This application is a United States National Phase application of PCT/US2013/027086 filed on Feb. 21, 2013, which claims priority to U.S. Provisional Application No. 61/706,892 filed on Sep. 28, 2012.

BACKGROUND OF THE INVENTION

A gas turbine engine includes a nacelle that surrounds a fan section and a core engine section. The nacelle may include a thrust reverser system. The thrust reverser system includes blocker doors that move when deployed to allow airflow to be directed through air diverter openings. The thrust reverser system is employed during landing for a short period relative to a normal operating cycle.

SUMMARY OF THE INVENTION

A gas turbine engine according to an exemplary embodiment of this disclosure, among other possible things includes a thrust reverser including a plurality of blocker doors moveable between a deployed position and a stowed position. A gap is defined between adjacent blocker doors when in the stowed position. A plurality of divots are mounted forward of the plurality of blocker doors to substantially cover the gap between the adjacent blocker doors when in the stowed position.

In a further embodiment of any of the foregoing gas turbine engines, the plurality of divots are substantially triangular.

In a further embodiment of any of the foregoing gas turbine engines, includes a nacelle structure including the thrust reverser, and a plurality of air diverter openings in the nacelle structure are exposed when the blocker doors are in the deployed position and the plurality of air diverter openings are covered when the blocker doors are in the stowed position.

In a further embodiment of any of the foregoing gas turbine engines, each of the plurality of blocker doors have a leading edge contour. Each of the plurality of blocker doors includes a front and two sides. The leading edge contour is oblique to the front and the two sides.

In a further embodiment of any of the foregoing gas turbine engines, includes a bull nose, and the plurality of divots are secured to the bull nose.

In a further embodiment of any of the foregoing gas turbine engines, the plurality of divots are integral with the bull nose.

In a further embodiment of any of the foregoing gas turbine engines, the plurality of divots are fastened to the bull nose.

In a further embodiment of any of the foregoing gas turbine engines, the plurality of divots are stationary relative to the gas turbine engine.

In a further embodiment of any of the foregoing gas turbine engines, the plurality of divots are attached to a fan duct.

In a further embodiment of any of the foregoing gas turbine engines, each of the plurality of divots have a same size and a same shape as the gap.

A gas turbine engine according to an exemplary embodiment of this disclosure, among other possible things includes a nacelle structure including a thrust reverser including a plurality of air diverter openings. A plurality of blocker doors are moveable between a deployed position and a stowed position. Each of the plurality of blocker doors includes a front and two sides. A leading edge contour is oblique to the front and the two sides. The plurality of air diverter openings in the nacelle structure are exposed when the blocker doors are in the deployed position. The plurality of air diverter openings in the nacelle structure are covered when the blocker doors are in the stowed position and define a gap between adjacent blocker doors. A plurality of divots are mounted forward of the plurality of blocker doors to substantially cover the gap between the adjacent blocker doors when in the stowed position. The plurality of divots are substantially triangular.

In a further embodiment of any of the foregoing gas turbine engines, includes a bull nose, and the plurality of divots are secured to the bull nose.

In a further embodiment of any of the foregoing gas turbine engines, the plurality of divots are integral with the bull nose.

In a further embodiment of any of the foregoing gas turbine engines, the plurality of divots are fastened to the bull nose.

In a further embodiment of any of the foregoing gas turbine engines, the plurality of divots are stationary relative to the gas turbine engine.

In a further embodiment of any of the foregoing gas turbine engines, the plurality of divots are attached to a fan duct.

In a further embodiment of any of the foregoing gas turbine engines, each of the plurality of divots have a same size and a same shape as the gap.

These and other features of the present invention can be best understood from the following specification and drawings, the following of which is a brief description.

BRIEF DESCRIPTION OF THE DRAWINGS

FIG. 2 illustrates a thrust reverser system in a stowed position;

FIG. 3 illustrates the thrust reverser system in a deployed position; and

DETAILED DESCRIPTION OF THE PREFERRED EMBODIMENTS

Figure 1:
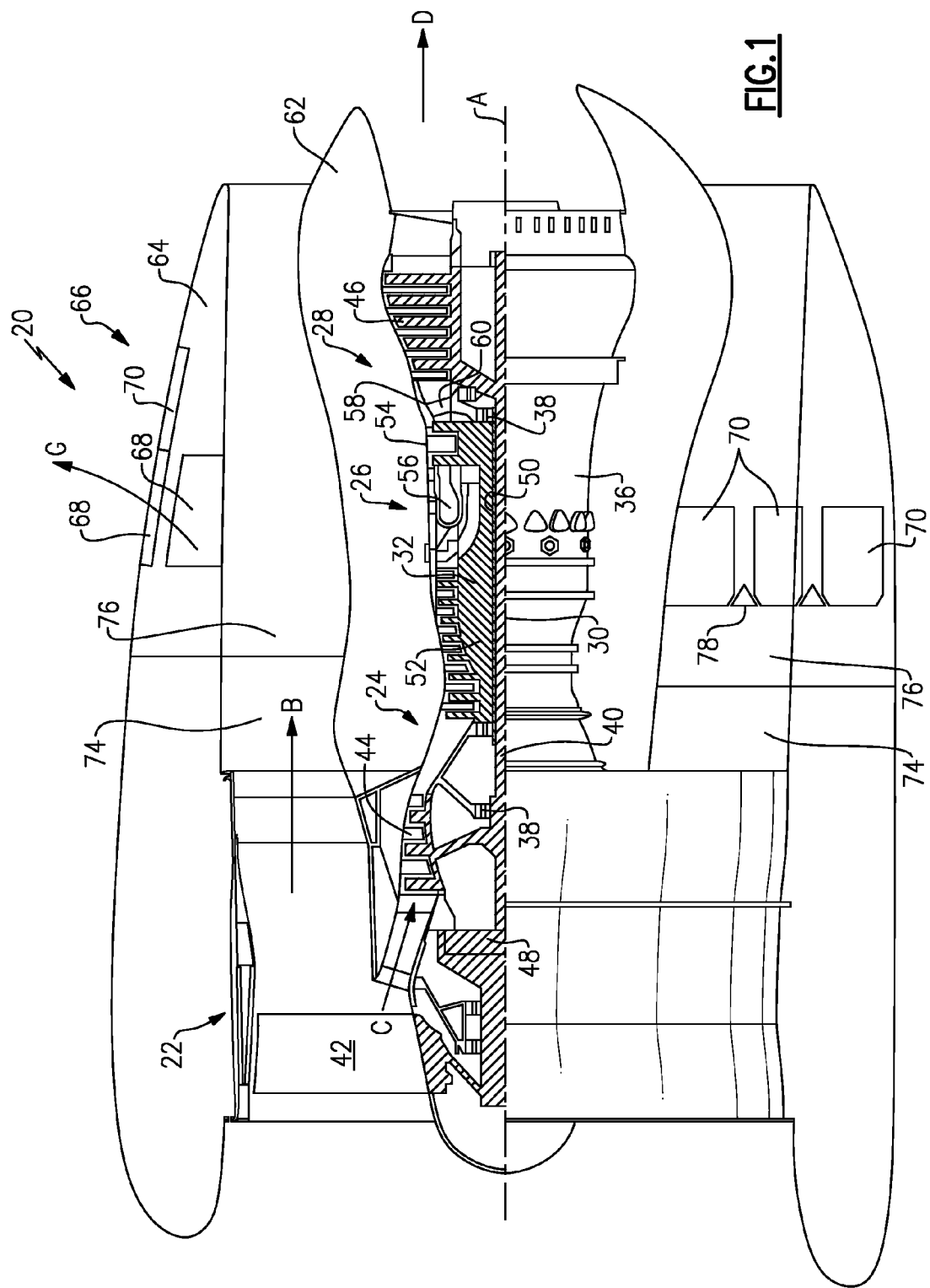
FIG. 1 illustrates a schematic view of an embodiment of a gas turbine engine.
Figure 4:
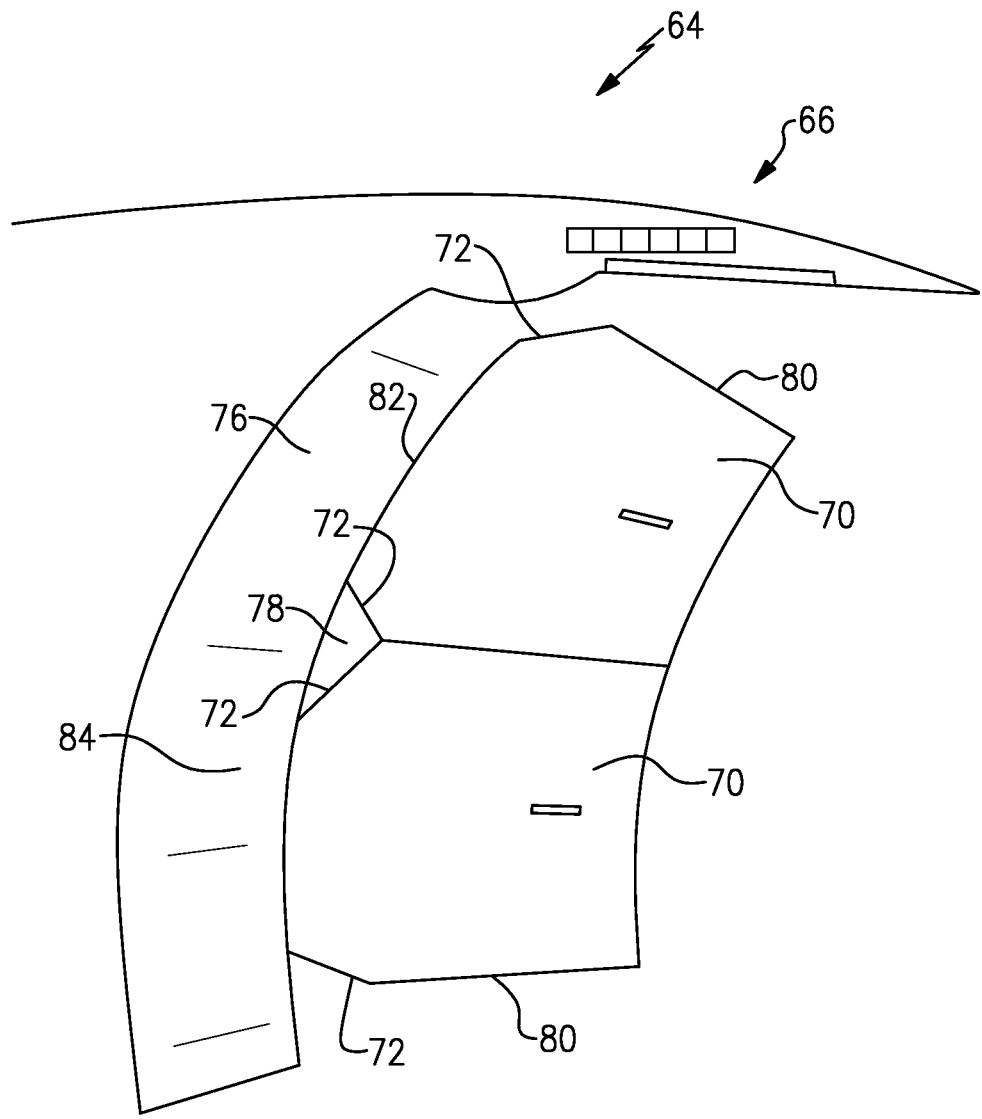
FIG. 4 illustrate a perspective view of the blocker doors of the thrust reverser system.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor 44 to a low pressure (or first) turbine 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor 52 and a high pressure (or second) turbine 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A core nacelle 62 surrounds the gas turbine engine 20. The fan section 22 directs the core flowpath C into the core nacelle 62. A core engine exhaust D exits the core nacelle 62.

The gas turbine engine 20 includes a nacelle structure 64 including a thrust reverser system 66. The thrust reverser system 66 includes blocker doors 70 that are each associated with an air diverter opening 68. The blocker doors 70 are moveable between a stowed position where the blocker doors 70 cover the air diverter openings 68 and a deployed position where the air diverter openings 68 are exposed.

FIG. 2 (and the bottom portion of FIG. 1, which shows an external view) shows the thrust reverser system 66 with the blocker doors 70 in the stowed position, which occurs essentially when the aircraft is not landing, for example, during takeoff and during cruise conditions. In the stowed position, the blocker doors 70 of the thrust reverser system 66 direct the airflow in the bypass flowpath B in a direction F that is approximately parallel to the longitudinal axis A for normal forward operation.

FIG. 3 (and the top portion of FIG. 1, which shows a cross-sectional view) shows the thrust reverser system 66 with the blocker doors 70 in the deployed position during landing. Actuation of the thrust reverser system 66 moves the blocker doors 70 relative to the nacelle structure 64 to obstruct and deflect a portion of the bypass airflow B. This directs the airflow in the bypass flowpath B outwardly in a direction G through the air diverter openings 68 to redirect the fan 42 air during reverse thrust operation and to assist in deceleration of the aircraft. The thrust reverser system 66 reduces the length of the landing roll of the aircraft without loss of directional control of the aircraft.

The blocker doors 70 have leading edge contours 72 that are a byproduct of the shape of a fan duct 74 and a bull nose 76. The bull nose 76 is the portion of the nacelle structure 64 forward of the thrust reverser system 66, that is, the portion with a rounded trim. The leading edge contour 72 of each blocker door 70 is shaped to prevent the blocker door 70 from digging into the "thick structure" 84 of the thrust reverser system 66 and to assist in closure of the blocker doors 70. Accordingly, the shape of the leading edge contour 72 is a function of the aero lines and shape of the fan duct 74.

In one example, the leading edge contours 72 are angled or oblique with respect to sides 80 and a front 82 of the blocker doors 70. However, when the blocker doors 70 are in the stowed position, the positioning of the leading edge contours 72 results in a gap between the blocker doors 70 and the bull nose 76 that can disrupt the bypass airflow B and cause a loss in performance.

In view of the mentioned gaps, the disclosed nacelle structure 64 includes divots 78 that provide for an improved aerodynamic shape and improved airflow over the blocker doors 70 when the blocker doors 70 are closed and in the stowed position. Each divot 78 is substantially triangular in shape and is fixed relative to the leading edge contours 72 of the blocker door 70. When the blocker doors 70 are in the stowed position, the divots 78 fill the gaps created between opposing edge contours 72 of adjacent blocker doors 70 and the bull nose 76. This creates a seal, improving airflow dynamics and reducing performance losses. Each of the divots 78 have the same size and the same shape as each of the gaps.

It should be understood that although triangular shaped divots 78 are illustrated and described, the divots 78 may be otherwise shaped so long as the divots 78 provide for improved aerodynamic properties and cover the gap.

In one example, the divots 78 are an integral part of the bull nose 76 or other structure proximate to the leading edge contour 72 of the blocker doors 70 when the blocker doors 70 are in the stowed position. In another example, the divots 78 are attached to the bull nose 76 by fasteners. In another example, the divots 78 are attached to an inner surface of the fan duct 74 proximate to each of the blocker doors 70.

Although a gas turbine engine 20 with geared architecture 48 is described, the divots 78 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A gas turbine engine comprising:
a thrust reverser including a plurality of blocker doors moveable between a deployed position and a stowed position, wherein a gap is defined between adjacent blocker doors when in the stowed position; and
a plurality of divots mounted forward of the plurality of blocker doors to limit air leakage through the gap between the adjacent blocker doors when in the stowed position;
wherein each of the plurality of blocker doors has a front side, two opposing lateral sides, and two corner portions that are each oblique to the front side and a respective one of the two opposing lateral sides; and
wherein in the stowed position, at least one of the opposing lateral sides of each blocker door abuts a lateral side of an adjacent blocker door, and at least one of the corner portions of each blocker door abuts one of the plurality of divots.

2. The gas turbine engine as recited in claim 1 wherein the plurality of divots are triangular.

3. The gas turbine engine as recited in claim 1 including a nacelle structure including the thrust reverser, and a plurality of air diverter openings in the nacelle structure that are exposed when the plurality of blocker doors are in the deployed position and are covered when the plurality of blocker doors are in the stowed position.

4. The gas turbine engine as recited in claim 1 including a bull nose, and the plurality of divots are secured to the bull nose.

5. The gas turbine engine as recited in claim 4 wherein the plurality of divots are integral with the bull nose.

6. The gas turbine engine as recited in claim 4 wherein the plurality of divots are fastened to the bull nose.

7. The gas turbine engine as recited in claim 1 wherein the plurality of divots are stationary relative to the gas turbine engine.

8. The gas turbine engine as recited in claim 1 wherein the plurality of divots are attached to a fan duct.

9. The gas turbine engine as recited in claim 1 wherein each of the plurality of divots have a same size and a same shape as the gap.

10. A gas turbine engine comprising:
a nacelle structure including a thrust reverser including a plurality of air diverter openings and a plurality of blocker doors moveable between a deployed position and a stowed position, wherein each of the plurality of blocker doors includes a front side, two opposing lateral sides, and two corner portions that are each oblique to the front side and a respective one of the two opposing lateral sides,
wherein the plurality of air diverter openings in the nacelle structure are exposed when the plurality of blocker doors are in the deployed position,
wherein the plurality of air diverter openings in the nacelle structure are covered when the plurality of blocker doors are in the stowed position and define a gap between adjacent blocker doors; and
a plurality of divots mounted forward of the plurality of blocker doors to limit air leakage through the gap between the adjacent blocker doors when in the stowed position, wherein the plurality of divots are triangular;
wherein in the stowed position, at least one of the opposing lateral sides of each blocker door abuts a lateral side of an adjacent blocker door, and at least one of the corner portions of each blocker door abuts one of the plurality of divots.

11. The gas turbine engine as recited in claim 10 including a bull nose, and the plurality of divots are secured to the bull nose.

12. The gas turbine engine as recited in claim 10 wherein the plurality of divots are integral with the bull nose.

13. The gas turbine engine as recited in claim 11 wherein the plurality of divots are fastened to the bull nose.

14. The gas turbine engine as recited in claim 10 wherein the plurality of divots are stationary relative to the gas turbine engine.

15. The gas turbine engine as recited in claim 10 wherein the plurality of divots are attached to a fan duct.

16. The gas turbine engine as recited in claim 10 wherein each of the plurality of divots have a same size and a same shape as the gap.

\* \* \* \* \*